US009712065B2

(12) United States Patent
Yang et al.

(10) Patent No.: US 9,712,065 B2
(45) Date of Patent: *Jul. 18, 2017

(54) SYSTEMS AND METHODS FOR SOURCE SWITCHING AND VOLTAGE GENERATION

(71) Applicant: ON-BRIGHT ELECTRONICS (SHANGHAI) CO., LTD., Shanghai (CN)

(72) Inventors: Jiqing Yang, Shanghai (CN); Jun Zhou, Shanghai (CN); Liqiang Zhu, Shanghai (CN); Qiang Luo, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/717,982

(22) Filed: May 20, 2015

(65) Prior Publication Data

US 2015/0318789 A1    Nov. 5, 2015

Related U.S. Application Data

(63) Continuation of application No. 13/734,634, filed on Jan. 4, 2013, now Pat. No. 9,071,151.

(30) Foreign Application Priority Data

Dec. 21, 2012    (CN) .......................... 2012 1 0564309

(51) Int. Cl.
   *H02M 3/335*    (2006.01)
(52) U.S. Cl.
   CPC ... *H02M 3/33507* (2013.01); *H02M 3/33523* (2013.01)

(58) Field of Classification Search
   CPC ............. H02M 3/335; H02M 3/33507; H02M 3/33523; H02M 2001/0003; H02M 1/32
   (Continued)

(56) References Cited

U.S. PATENT DOCUMENTS 4,887,199 A * 12/1989 Whittle ................... H02M 1/36
                                                    363/21.1
5,089,947 A *  2/1992 Driscoll ............ H02M 3/33507
                                                    315/411
(Continued)

FOREIGN PATENT DOCUMENTS

CN    101197539    6/2008
CN    201087939    7/2008
(Continued)

OTHER PUBLICATIONS

China Patent Office, Office Action issued May 6, 2015, in Application No. 201210564309.4.

(Continued)

*Primary Examiner* — Gary L Laxton
(74) *Attorney, Agent, or Firm* — Jones Day

(57) ABSTRACT

System and method for regulating a power conversion system. An example system controller for regulating a power conversion system includes a first controller terminal associated with a first controller voltage and coupled to a first transistor terminal of a first transistor, the first transistor further including a second transistor terminal and a third transistor terminal, the second transistor terminal being coupled to a primary winding of a power conversion system, a second controller terminal associated with a second controller voltage and coupled to the third transistor terminal, and a third controller terminal associated with a third controller voltage. The first controller voltage is equal to a sum of the third controller voltage and a first voltage difference. The second controller voltage is equal to a sum (Continued)

of the third controller voltage and a second voltage difference.

32 Claims, 6 Drawing Sheets

(58) Field of Classification Search
USPC .............................. 363/21.16, 21.17, 21.18
See application file for complete search history.

(56) References Cited

U.S. PATENT DOCUMENTS

| | | | |
|---|---|---|---|
| 5,481,450 A * | 1/1996 | Lee .................. | H02M 3/33523 307/17 |
| 5,506,764 A * | 4/1996 | Hon .................. | H01F 3/14 336/178 |
| 5,793,621 A * | 8/1998 | Yamada ................ | G09G 1/005 315/411 |
| 5,978,235 A * | 11/1999 | Lampinen ........... | H02M 3/3385 363/21.16 |
| 6,972,969 B1 | 12/2005 | Shteynberg et al. | |
| 7,447,049 B2 | 11/2008 | Garner et al. | |
| 7,596,004 B2 | 9/2009 | Grbovic | |
| 7,826,237 B2 | 11/2010 | Zhang et al. | |
| 8,102,676 B2 | 1/2012 | Huynh et al. | |
| 8,125,798 B2 | 2/2012 | Huynh et al. | |
| 8,416,589 B2 | 4/2013 | Portisch | |
| 8,824,173 B2 | 9/2014 | Fang et al. | |
| 2008/0094047 A1 | 4/2008 | Huynh et al. | |
| 2009/0207636 A1 | 8/2009 | Huynh et al. | |
| 2010/0061126 A1 | 3/2010 | Huynh et al. | |
| 2011/0286247 A1 | 11/2011 | Keogh et al. | |

FOREIGN PATENT DOCUMENTS

| | | |
|---|---|---|
| CN | 101604672 | 12/2009 |
| EP | 2525480 | 11/2012 |
| TW | 201234754 | 8/2012 |

OTHER PUBLICATIONS

Taiwan Intellectual Property Office, Office Action issued Oct. 1, 2014, in Taiwan Patent Application No. 102112122.
United States Patent and Trademark Office, Notice of Allowance mailed Mar. 6, 2015, in U.S. Appl. No. 13/734,634.
United States Patent and Trademark Office, Notice of Allowance mailed Nov. 6, 2014, in U.S. Appl. No. 13/734,634.
China Patent Office, Office Action issued Sep. 20, 2016, in Application No. 201410852932.9.

* cited by examiner

SYSTEMS AND METHODS FOR SOURCE SWITCHING AND VOLTAGE GENERATION

1. CROSS-REFERENCES TO RELATED APPLICATIONS

This application is a continuation of U.S. patent application Ser. No. 13/734,634, filed Jan. 4, 2013, which claims priority to Chinese Patent Application No. 201210564309.4, filed Dec. 21, 2012, both applications being incorporated by reference herein for all purposes.

2. BACKGROUND OF THE INVENTION

The present invention is directed to integrated circuits. More particularly, the invention provides systems and methods for source switching and/or internal voltage generation. Merely by way of example, the invention has been applied to a power conversion system. But it would be recognized that the invention has a much broader range of applicability.

Conventional switch-mode power supplies often implement gate controlled switching using high voltage power MOSFETs. But high voltage start-up circuits for such switch-mode power supplies are usually manufactured using an expensive high voltage semiconductor process. In addition, the conventional switch-mode power supplies often suffer from slow start-up and high standby power consumption.

Hence, it is highly desirable to improve switching schemes of a power conversion system.

3. BRIEF SUMMARY OF THE INVENTION

The present invention is directed to integrated circuits. More particularly, the invention provides systems and methods for source switching and/or internal voltage generation. Merely by way of example, the invention has been applied to a power conversion system. But it would be recognized that the invention has a much broader range of applicability.

According to one embodiment, a system controller for regulating a power conversion system includes a first controller terminal associated with a first controller voltage and coupled to a first transistor terminal of a first transistor, the first transistor further including a second transistor terminal and a third transistor terminal, the second transistor terminal being coupled to a primary winding of a power conversion system, a second controller terminal associated with a second controller voltage and coupled to the third transistor terminal, and a third controller terminal associated with a third controller voltage. The first controller voltage is equal to a sum of the third controller voltage and a first voltage difference. The second controller voltage is equal to a sum of the third controller voltage and a second voltage difference. The system controller is configured to, keep the first voltage difference constant and change the second voltage difference to turn on or off the first transistor and to affect a primary current flowing through the primary winding.

According to another embodiment, a system controller for regulating a power conversion system includes a first controller terminal associated with a first controller voltage and coupled to a first transistor terminal of a first transistor, the first transistor further including a second transistor terminal and a third transistor terminal, the second transistor terminal being coupled to a primary winding of a power conversion system, a second controller terminal associated with a second controller voltage and coupled to the third transistor terminal and a first capacitor terminal of a first capacitor, and a third controller terminal associated with a third controller voltage. The system controller further includes a second transistor including a fourth transistor terminal, a fifth transistor terminal and a sixth transistor terminal, the fifth transistor terminal being coupled to the second controller terminal, and a first clamping component including a first component terminal and a second component terminal, the first component terminal being coupled to the first controller terminal.

According to yet another embodiment, a system controller for regulating a power conversion system includes a first controller terminal associated with a first controller voltage and coupled to a first transistor terminal of a first transistor, the first transistor further including a second transistor terminal and a third transistor terminal, the second transistor terminal being coupled to a primary winding of a power conversion system, a second controller terminal associated with a second controller voltage and coupled to the third transistor terminal, the second controller terminal being further coupled to a first capacitor terminal of a first capacitor through a diode, and a third controller terminal associated with a third controller voltage. The system controller further includes a second transistor including a fourth transistor terminal, a fifth transistor terminal and a sixth transistor terminal, the fifth transistor terminal being coupled to the second controller terminal, and the diode including an anode terminal and a cathode terminal, the cathode terminal being coupled to the first capacitor terminal, the anode terminal being coupled to the second controller terminal. The system controller is configured to charge the first capacitor through the diode in response to one or more current spikes.

According to yet another embodiment, a system controller for regulating a power conversion system includes, a first controller terminal associated with a first controller voltage and coupled to a first transistor terminal of a first transistor, the first transistor further including a second transistor terminal and a third transistor terminal, the second transistor terminal being coupled to a primary winding of the power conversion system, a second controller terminal associated with a second controller voltage and coupled to the third transistor terminal, and a third controller terminal associated with a third controller voltage. The system controller further includes a fourth controller terminal associated with a fourth controller voltage and coupled to a first capacitor terminal of a capacitor, the capacitor further including a second capacitor terminal coupled to the third controller terminal, a second transistor including a fourth transistor terminal, a fifth transistor terminal and a sixth transistor terminal, the fifth transistor terminal being coupled to the second controller terminal, and a switch configured to received a control signal and including a first switch terminal and a second switch terminal, the first switch terminal coupled to the second controller terminal, the second switch terminal coupled to the fourth controller terminal. The system controller is configured to close the switch if the second transistor is turned on and if the fourth controller voltage is smaller than a first threshold.

In one embodiment, a system controller for regulating a power conversion system includes, a first controller terminal associated with a first controller voltage and coupled to a first transistor terminal of a first transistor, the first transistor further including a second transistor terminal and a third transistor terminal, the third transistor terminal being coupled to a primary winding of the power conversion system, a second transistor including a fourth transistor terminal, a fifth transistor terminal and a sixth transistor terminal, the sixth transistor terminal coupled to a first resistor, and a first clamping component coupled to the fourth transistor terminal. The first clamping component is configured to receive a current associated with the first controller voltage, generate a reference voltage based on at least information associated with the current, and bias the fourth transistor terminal to the reference voltage to generate a supple voltage at the fifth transistor terminal.

In another embodiment, a method for regulating a power conversion system including a system controller with a first controller terminal, a second controller terminal and a third controller terminal, includes, generating a first controller voltage associated with the first controller terminal coupled to a first transistor terminal of a first transistor, the first transistor further including a second transistor terminal and a third transistor terminal, the second transistor terminal being coupled to a primary winding of the power conversion system, generating a second controller voltage associated with the second controller terminal coupled to the third transistor terminal, and generating a third controller voltage associated with the third controller terminal. The method further includes processing information associated with the first controller voltage, the second controller voltage and the third controller voltage, the first controller voltage being equal to a sum of the third controller voltage and a first voltage difference, the second controller voltage is equal to a sum of the third controller voltage and a second voltage difference, keeping the first voltage difference constant, and changing the second voltage difference to turn on or off the first transistor to affect a primary current flowing through the primary winding.

In yet another embodiment, a method for regulating a power conversion system including a system controller with a controller terminal includes, generating a controller voltage associated with the controller terminal coupled to a first transistor terminal of a first transistor, the first transistor further including a second transistor terminal and a third transistor terminal, the third transistor terminal being coupled to a primary winding of the power conversion system, generating a current associated with the controller voltage, biasing a fourth transistor terminal of a second transistor to a reference voltage based on at least information associated with the current, the second transistor further including a fifth transistor terminal and a sixth transistor terminal, the sixth transistor terminal being coupled to a resistor, and generating a supply voltage at the fifth transistor terminal based on at least information associated with the reference voltage.

According to another embodiment, a system controller for regulating a power conversion system includes a controller terminal associated with a controller voltage and coupled to a first transistor terminal of a first transistor, the first transistor further including a second transistor terminal and a third transistor terminal, the third transistor terminal being coupled to a primary winding of the power conversion system, a first resistor coupled to the controller terminal, and a clamping component coupled to the first resistor. The clamping component is configured to receive a current from the first resistor associated with the controller voltage, generate a reference voltage based on at least information associated with the current, and output the reference voltage to a voltage regulator.

According to yet another embodiment, a method for regulating a power conversion system including a system controller with a controller terminal includes, generating a controller voltage associated with the controller terminal coupled to a first transistor terminal of a first transistor, the first transistor further including a second transistor terminal and a third transistor terminal, the third transistor terminal being coupled to a primary winding of the power conversion system, generating a current associated with the controller voltage, the current flowing through a resistor coupled to the controller terminal, generating a reference voltage based on at least information associated with the current, and outputting the reference voltage to a voltage regulator.

Many benefits are achieved by way of the present invention over conventional techniques. For example, some embodiments of the present invention provide a scheme of source switching using an internal transistor in a system controller. In another example, certain embodiments of the present invention provide systems and methods for reducing an under-voltage lockout (UVLO) threshold voltage, e.g., close to an internal supply voltage. In yet another example, some embodiments of the present invention provide systems and methods for charging a capacitor quickly during a start-up process to provide a supply voltage using a conduction current of a transistor.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides systems and methods for source switching and/or internal voltage generation. Merely by way of example, the invention has been applied to a power conversion system. But it would be recognized that the invention has a much broader range of applicability.

Figure 1:
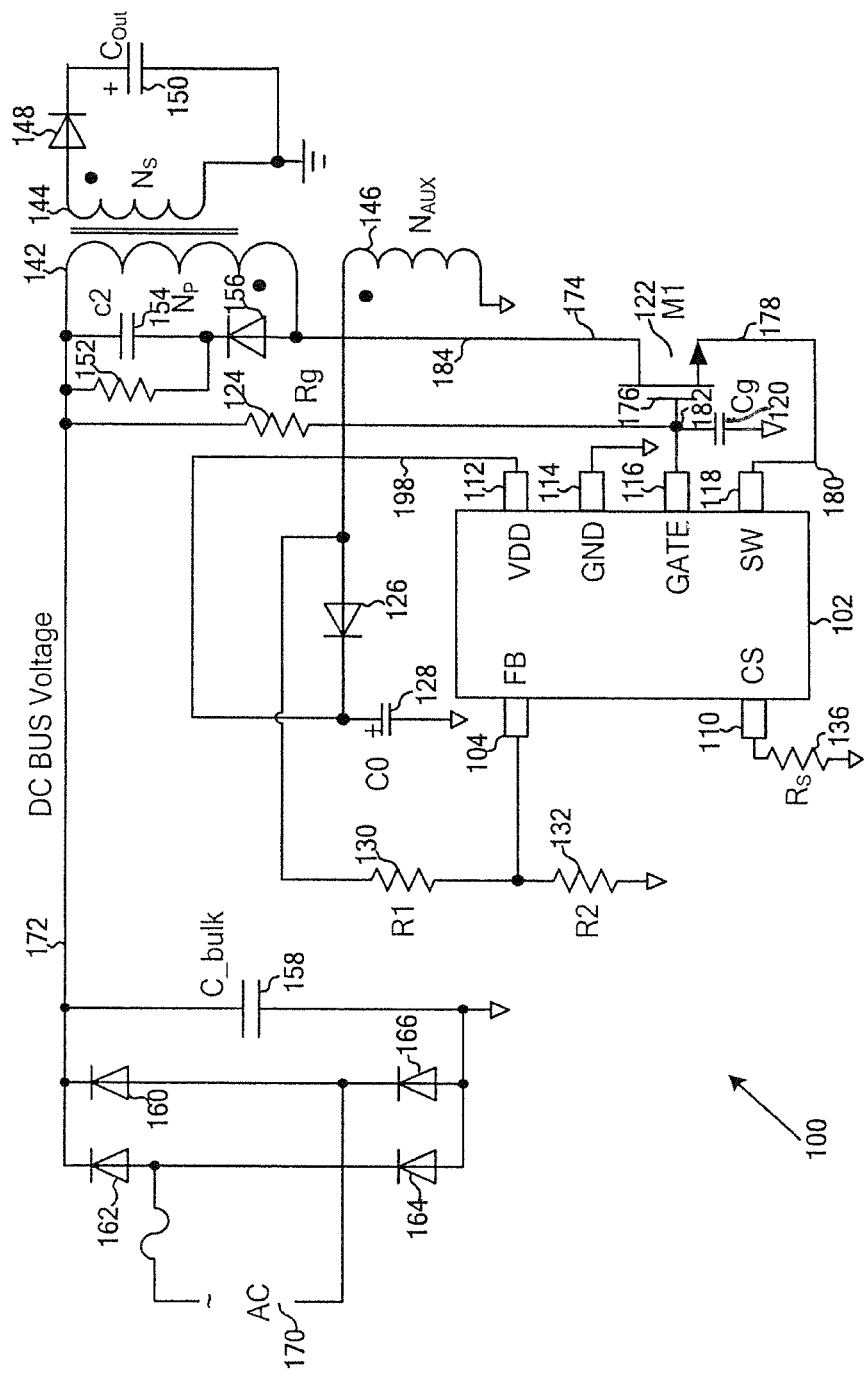
FIG. 1 is a simplified diagram showing a power conversion system with source switching and/or internal voltage generation according to an embodiment of the present invention.

FIG. 1 is a simplified diagram showing a power conversion system with source switching and/or internal voltage generation according to an embodiment of the present invention. This diagram is merely an example, which should not unduly limit the scope of the claims. One of ordinary skill in the art would recognize many variations, alternatives, and modifications.

The power conversion system 100 includes a controller 102, a primary winding 142, a secondary winding 144, an auxiliary winding 146, a switch 122, capacitors 120, 128, 150, 154 and 158, resistors 124, 130, 132, 136 and 152, a full wave rectifying bridge including diodes 160, 162, 164 and 166, and diodes 126, 148 and 156. The controller 102 includes terminals 104, 110, 112, 114, 116 and 118. For example, the system 100 provides power to one or more light emitting diodes. In another example, the switch 122 is a transistor. In yet another example, the switch 122 is a field effect transistor (e.g., a metal-oxide-semiconductor field effect transistor), including a terminal 174 (e.g., drain terminal), a terminal 176 (e.g., gate terminal) and a terminal 178 (e.g., source terminal).

According to one embodiment, the transistor 122 is turned on and off based on a difference between a voltage signal 182 at the terminal 176 (e.g., gate terminal) and a voltage signal 180 at the terminal 178 (e.g., source terminal). In another example, the system 100 performs source switching of the transistor 122 through changing the voltage signal 180 at the terminal 178 (e.g., source terminal). In yet another example, the system 100 performs source switching of the transistor 122 through keeping the voltage signal 182 at the terminal 176 constant and changing the voltage signal 180 at the terminal 178 (e.g., source terminal). In yet another example, the terminal 174 (e.g., drain terminal) of the transistor 122 is connected, directly or indirectly, to the primary winding 142, and the terminal 176 (e.g., gate terminal) of the transistor 122 is connected to the terminal 116 (e.g., terminal GATE). In yet another example, the terminal 178 (e.g., source terminal) of the transistor 122 is connected to the terminal 118 (e.g., terminal SW).

As shown in FIG. 1, the full wave rectifying bridge including the diodes 160, 162, 164 and 166 processes an AC input signal from an AC supply component 170, and generates a voltage signal 172 in some embodiments. For example, the voltage signal 182 increases in magnitude in response to the voltage signal 172 through the resistor 124 and the capacitor 120, and eventually reaches a predetermined magnitude. In another example, the voltage signal 182 is fixed at the predetermined magnitude. In yet another example, if the difference between the voltage signal 182 and the voltage signal 180 is larger than a threshold, the transistor 122 is turned on. In yet another example, a current 184 flows through the transistor 122 into the terminal 118 (e.g., terminal SW), and flows out of the terminal 112 (e.g., terminal VDD) to charge the capacitor 128 in order to provide a supply voltage for the controller 102.

In another embodiment, the system 100 performs internal voltage generation for the controller 102. For example, when the controller 102 begins to operate normally, the charged capacitor 120 provides an internal current in order to generate an internal supply voltage for the controller 102. In another example, the generated internal supply voltage is about 5 V. In yet another example, a supply voltage signal 198 at the terminal 112 (e.g., terminal VDD) can be as low as the internal supply voltage.

Figure 2:
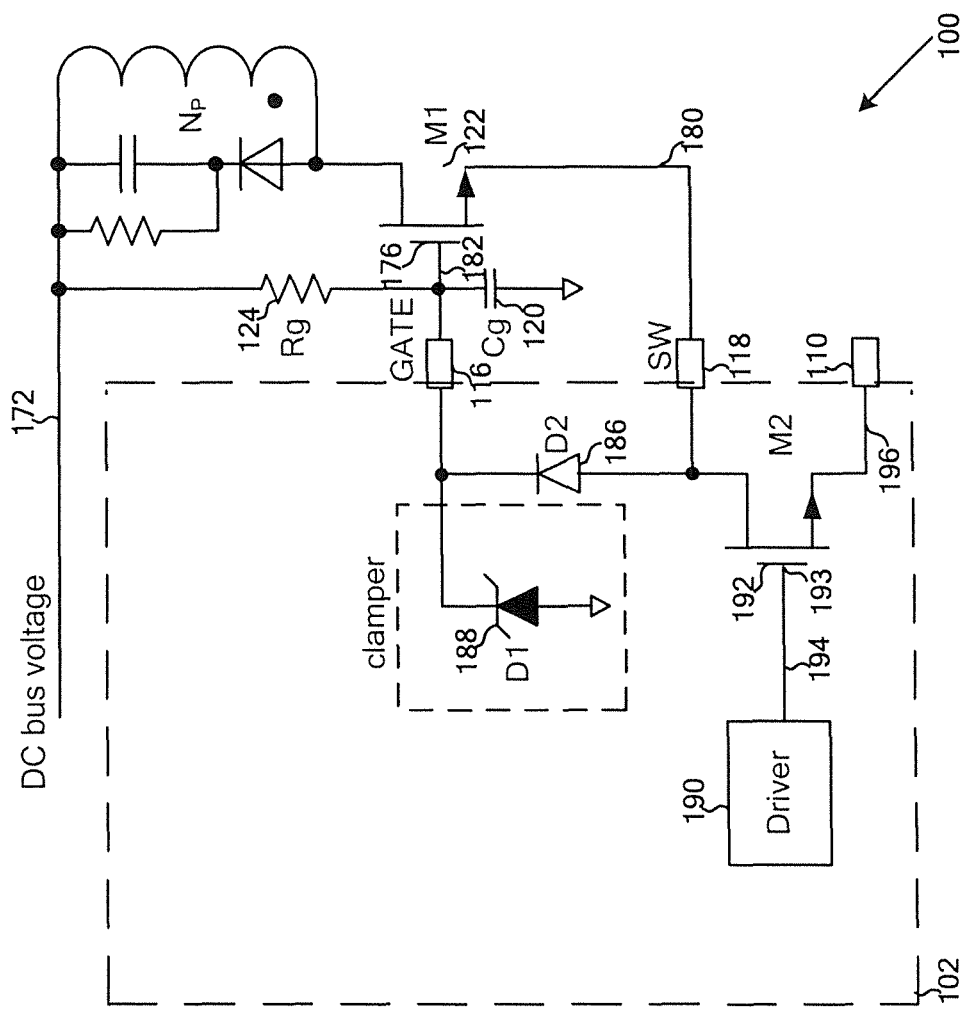
FIG. 2 is a simplified diagram showing certain components of the controller 102 as part of the power conversion system 100 according to an embodiment of the present invention.

FIG. 2 is a simplified diagram showing certain components of the controller 102 as part of the power conversion system 100 according to an embodiment of the present invention. This diagram is merely an example, which should not unduly limit the scope of the claims. One of ordinary skill in the art would recognize many variations, alternatives, and modifications. The controller 102 includes a voltage clamper 188 (e.g., a zener diode), a diode 186, a driver component 190, and a switch 192. For example, the switch 192 is a transistor. In another example, the switch 192 is a field effect transistor (e.g., a MOSFET).

As shown in FIG. 2, the driver component 190 affects a voltage signal 194 at a terminal 193 (e.g., gate terminal) of the transistor 192 to turn on or off the transistor 192 according to certain embodiments. For example, when the transistor 192 is turned off, the transistor 122 is off. In another example, when the transistor 192 is turned on, a voltage 196 at the terminal 110 is approximately equal to the voltage signal 180 and the transistor 122 is on if the difference between the voltage signal 182 and the voltage signal 180 is larger than a threshold. In yet another example, during the start-up process, the capacitor 120 is charged in response to the voltage signal 172 and the voltage signal 182 increases in magnitude. Once the voltage signal 182 reaches a predetermined magnitude, the voltage clamper 188 clamps (e.g., fixes) the voltage signal 182 at the predetermined magnitude (e.g., a breakdown voltage of the voltage clamper 188) in some embodiments. For example, it was clamped by the voltage clamper 188 in some embodiments. For example, the properties of the voltage damper 188 affect the predetermined magnitude (e.g., 18 V). In another example, a maximum value of the voltage signal 180 is equal to a sum of the voltage signal 182 and a voltage drop on the diode 186 in magnitude. In yet another example, during normal operations, the capacitor 120 continues to receive electric charges (e.g., from spikes resulting from the switching of the transistor 122 and the transistor 192) to keep the voltage signal 182 constant or substantially constant.

Figure 3A:
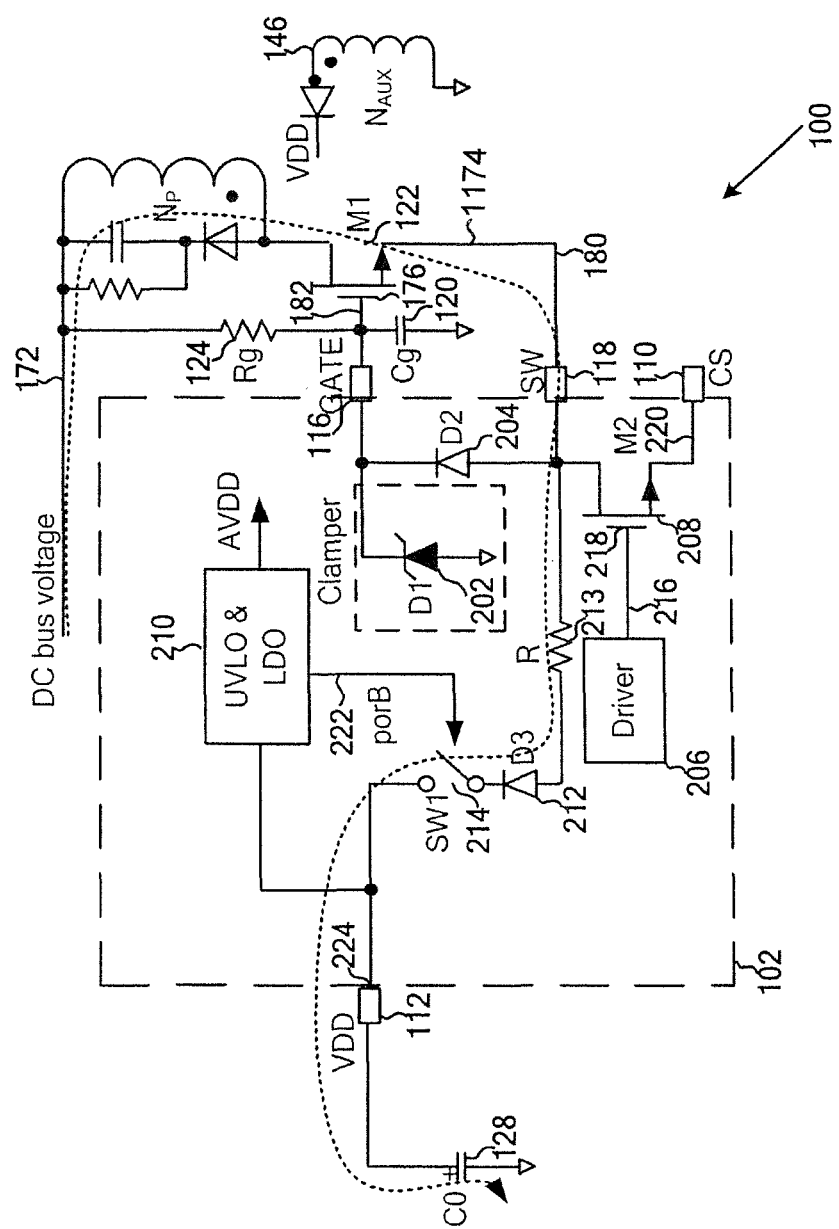
FIG. 3(a) is a simplified diagram showing certain components of the controller 102 as part of the power conversion system 100 according to another embodiment of the present invention.

FIG. 3(a) is a simplified diagram showing certain components of the controller 102 as part of the power conversion system 100 according to another embodiment of the present invention. This diagram is merely an example, which should not unduly limit the scope of the claims. One of ordinary skill in the art would recognize many variations, alternatives, and modifications. The controller 102 includes a voltage clamper 202 (e.g., a zener diode), diodes 204 and 212, a driver component 206, a switch 208, an under-voltage lockout and low drop-out (UVLO & LDO) component 210, a resistor 213 and a switch 214. For example, the switch 208 is a transistor. In another example, the switch 208 is a field effect transistor (e.g., a MOSFET).

As shown in FIG. 3(a), the driver component 206 affects a voltage signal 216 at a terminal 218 (e.g., gate terminal) of the transistor 208 to turn on or off the transistor 208 according to certain embodiments. For example, the status of the transistor 122 (e.g., on or off) depends on whether the transistor 208 is turned on or off. In another example, during the start-up process, the voltage signal 182 increases in magnitude in response to the voltage signal 172 through the resistor 124 and the capacitor 120. Once the voltage signal 182 reaches a predetermined magnitude, the voltage clamper 202 (e.g., a zener diode) clamps (e.g., fixes) the voltage signal 182 at the predetermined magnitude (e.g., a breakdown voltage of the voltage clamper 202) in some embodiments. For example, the properties of the voltage clamper 202 affect the predetermined magnitude (e.g., 18 V).

In one embodiment, when the difference between the voltage signal 182 and the voltage signal 180 is larger than a threshold, the transistor 122 begins to conduct a current 1174 which flows through the terminal 118 (e.g., terminal SW). In another example, if the switch 214 is closed (e.g., on) in response to a signal 222 (e.g., porB) generated by the UVLO & LDO component 210, the current 1174 flows through the diode 212 and the switch 214 to charge the capacitor 128 and a voltage signal 224 at the terminal 112 (e.g., terminal VDD) increases in magnitude. In yet another example, when the voltage signal 224 exceeds a first predetermined threshold voltage (e.g., an upper threshold) in magnitude, the UVLO & LDO component 210 changes the signal 222 to open (e.g., to turn off) the switch 214. In yet another example, if the voltage signal 224 drops below a second predetermined threshold voltage (e.g., a lower threshold) in magnitude, the UVLO & LDO component 210 changes the signal 222 to close (e.g., to turn on) the switch 214 in order to charge the capacitor 128 again. In yet another example, the current 1174 is limited by at least the resistor 213 coupled between the terminal 118 (e.g., terminal SW) and the terminal 112 (e.g., terminal VDD). In another example, a maximum value of the voltage signal 180 is equal to a sum of the voltage signal 182 and a voltage drop on the diode 204 in magnitude. In yet another example, the first predetermined threshold voltage is different from or the same as the second predetermined threshold voltage. The resistor 213 is omitted in some embodiments.

In another embodiment, the auxiliary winding 146 is removed, and the switch 214 is always kept on. In yet another embodiment, the auxiliary winding 146 and the switch 214 are removed, and the diode 212 is coupled between the terminal 118 and the terminal 112. For example, without the auxiliary winding 146, the supply voltage of the controller 102 is provided through the transistor 122. In another example, the switch 214 is implemented using a p-channel field effect transistor (e.g., a p-channel metal-oxide-semiconductor field effect transistor).

Figure 3B:
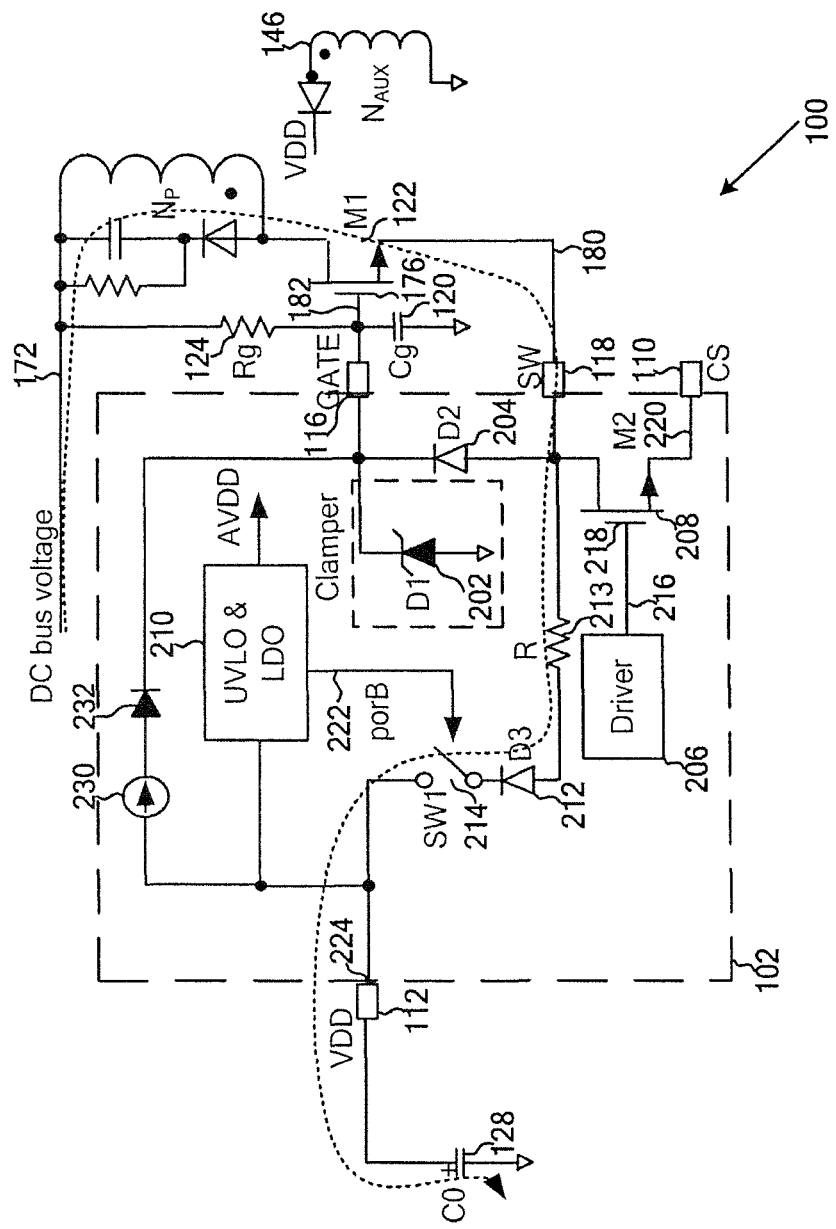
FIG. 3(b) is a simplified diagram showing certain components of the controller 102 as part of the power conversion system 100 according to yet another embodiment of the present invention.

FIG. 3(b) is a simplified diagram showing certain components of the controller 102 as part of the power conversion system 100 according to yet another embodiment of the present invention. This diagram is merely an example, which should not unduly limit the scope of the claims. One of ordinary skill in the art would recognize many variations, alternatives, and modifications. The controller 102 includes a voltage clamper 202 (e.g., a zener diode), diodes 204 and 212, a driver component 206, a transistor 208, an under-voltage lockout and low drop-out (UVLO & LDO) component 210, a resistor 213, and a switch 214. In addition, the controller 102 includes a current source 230 and a diode 232. For example, the transistor 208 is a field effect transistor (e.g., a MOSFET).

According to one embodiment, the voltage signal 182 at the terminal 176 (e.g., the gate terminal of the transistor 122) is kept no less than a predetermined level. For example, the diode 232 has a forward voltage (e.g., $V_f$). In another example, during normal operation of the power conversion system 100, the voltage signal 224 at the terminal 112 (e.g., terminal VDD) is no less than an under-voltage lockout voltage (e.g., $V_{UVLO}$). Thus, a minimum of the voltage signal 182 is determined as follows according to certain embodiments:

$$V_{GATE} \geq V_{UVLO} - V_f \qquad (1)$$

where $V_{GATE}$ represents the voltage signal 182. For example, when the voltage signal 182 is lower in magnitude than the voltage signal 224 minus the forward voltage of the diode 232, the capacitor 120 is charged in response to a current 234 flowing from the terminal 112 (e.g., terminal VDD) to the terminal 116 (e.g., terminal GATE) through the diode 232.

Figure 4:
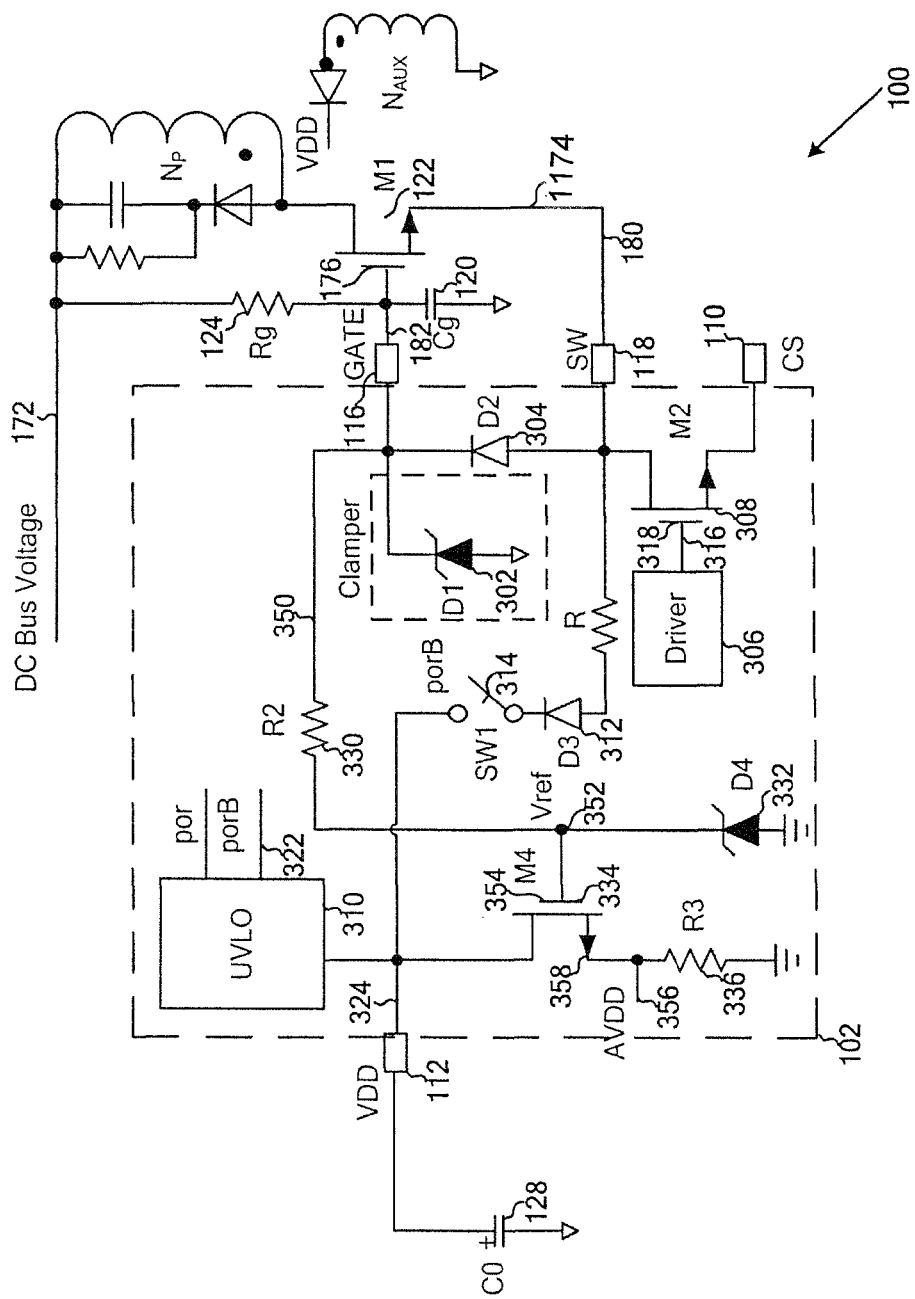
FIG. 4 is a simplified diagram showing certain components of the controller 102 as part of the power conversion system 100 according to yet another embodiment of the present invention.

FIG. 4 is a simplified diagram showing certain components of the controller 102 as part of the power conversion system 100 according to yet another embodiment of the present invention. This diagram is merely an example, which should not unduly limit the scope of the claims. One of ordinary skill in the art would recognize many variations, alternatives, and modifications. The controller 102 includes voltage clampers 302 and 332, diodes 304 and 312, a driver component 306, switches 308 and 334, an under-voltage lockout (UVLO) component 310, a switch 314, and resistors 330 and 336. For example, the switches 308 and 334 are transistors. In another example, the switch 308 is a field effect transistor (e.g., a MOSFET). In another example, the switch 334 is a field effect transistor (e.g., a MOSFET).

As shown in FIG. 4, the driver component 306 affects a voltage signal 316 at a terminal 318 (e.g., gate terminal) of the transistor 308 to turn on or off the transistor 308 according to certain embodiments. For example, the status of the transistor 122 (e.g., on or off) depends on whether the transistor 308 is turned on or off. In another example, during the start-up process, the voltage signal 182 increases in magnitude in response to the voltage signal 172 through the resistor 124 and the capacitor 120. Once the voltage signal 182 reaches a predetermined magnitude, the voltage clamper 302 clamps (e.g., fixes) the voltage signal 182 at the predetermined magnitude (e.g., a breakdown voltage of the voltage clamper 302) in some embodiments.

In one embodiment, when the difference between the voltage signal 182 and the voltage signal 180 is larger than a threshold, the transistor 122 begins to conduct a current 1174 which flows through the terminal 118 (e.g., terminal SW). In another example, if the switch 314 is closed (e.g., on) in response to a signal 322 (e.g., porB) generated by the UVLO component 310, the current 1174 flows through the diode 312 and the switch 314 to charge the capacitor 128 and a voltage signal 324 at the terminal 112 (e.g., terminal VDD) increases in magnitude. In yet another example, when the voltage signal 324 exceeds a first predetermined threshold voltage (e.g., an upper threshold) in magnitude, the UVLO component 310 changes the signal 322 to open (e.g., to turn off) the switch 314. In yet another example, if the voltage signal 324 drops below a second predetermined threshold voltage (e.g., a lower threshold) in magnitude, the UVLO component 310 changes the signal 322 to close (e.g., to turn on) the switch 314 in order to charge the capacitor 128 again. In yet another example, the first predetermined threshold voltage is different from or the same as the second predetermined threshold voltage.

In another embodiment, when the controller 102 begins to operate normally, and the charged capacitor 120 provides a current 350 which flows through the resistor 330. For example, a reference voltage signal 352 (e.g., $V_{ref}$) is generated in response to the current 350 flowing from the resistor 330 to the voltage clamper 332. In some embodiments, the reference voltage signal 352 is provided to a voltage regulator as a reference level. For example, the voltage regulator includes the transistor 334 which is configured as a source follower. In another example, the reference voltage signal 352 (e.g., $V_{ref}$) is generated at a terminal 354 (e.g., gate terminal) of the transistor 334. In yet another example, once the voltage signal 352 (e.g., $V_{ref}$) reaches a predetermined magnitude, the voltage clamper 332 clamps (e.g., fixes) the voltage signal 352 at the predetermined magnitude (e.g., a breakdown voltage of the voltage clamper 332). In yet another example, if the transistor 334 is turned on, a voltage signal 356 (e.g., AVDD) is generated at a terminal 358 of the transistor 334 through the resistor 336. In yet another example, the voltage signal 356 (e.g., AVDD) is used for providing an internal supply voltage for the controller 102. In yet another example, the signal 356 (e.g., AVDD) is an internal signal of the controller 102, e.g., an internal supply voltage.

$$V_{AVDD} = V_{ref} - V_{th} \qquad (2)$$

where $V_{ref}$ represents the reference voltage signal 352, and $V_{th}$ represents a threshold voltage of the transistor 334.

For example, the breakdown voltage of the voltage clamper 332 (e.g., a zener diode) is about 6 V, and a threshold voltage of the transistor 334 is about 1 V. The voltage signal 356 is generated to be about 5 V in some embodiments. For example, even if the voltage signal 324 is as low as about 5 V, the transistor 334 can still generate the voltage signal 356 at about 5 V by operating in a linear region. Thus, the second predetermined threshold voltage (e.g., the lower threshold) of the UVLO component 310 can be reduced to a low magnitude (e.g., 5 V) in certain embodiments.

In yet another embodiment, during normal operations, the capacitor 120 is charged in response to spikes generated at each switching of the transistor 308 (e.g., M2) through the diode 304 (e.g., D2) in order to keep the voltage signal 182 constant or substantially constant. For example, the resistor 124 has a large resistance in order to reduce power loss. In another example, the spikes are generated mainly when the transistor 308 is turned off.

Figure 5:
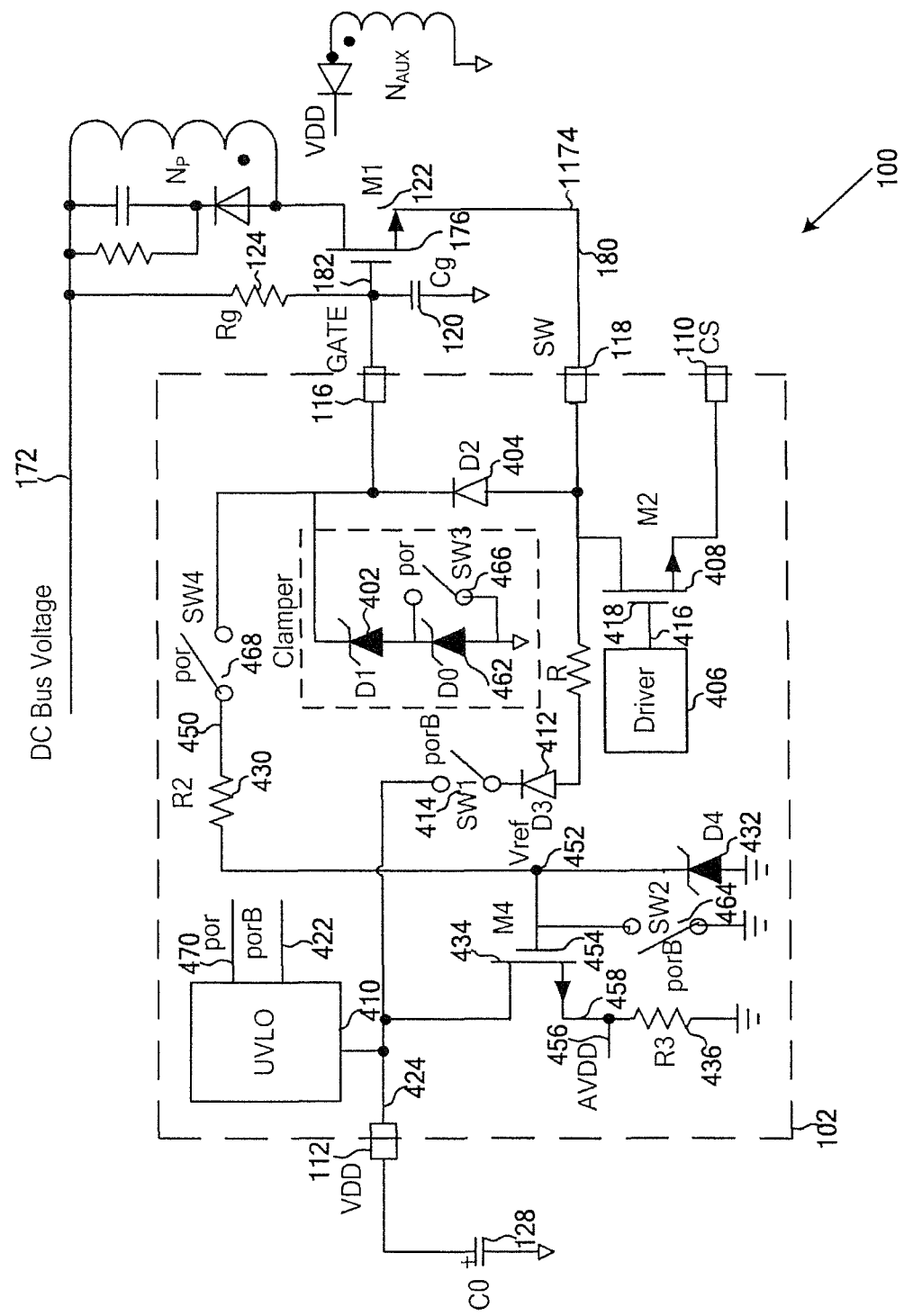
FIG. 5 is a simplified diagram showing certain components of the controller 102 as part of the power conversion system 100 according to yet another embodiment of the present invention.

FIG. 5 is a simplified diagram showing certain components of the controller 102 as part of the power conversion system 100 according to yet another embodiment of the present invention. This diagram is merely an example, which should not unduly limit the scope of the claims. One of ordinary skill in the art would recognize many variations, alternatives, and modifications. The controller 402 includes zener diodes 402, 432 and 462, diodes 404 and 412, a driver component 406, transistors 408 and 434, an under-voltage lockout (UVLO) component 410, switches 414, 464, 466 and 468, and resistors 430 and 436. For example, the transistor 408 is a field effect transistor (e.g., a MOSFET). In another example, the transistor 434 is a field effect transistor (e.g., a MOSFET).

As shown in FIG. 5, the driver component 406 affects a voltage signal 416 at a terminal 418 (e.g., gate terminal) of the transistor 408 to turn on or off the transistor 408 according to certain embodiments. For example, the status of the transistor 122 (e.g., on or off) depends on whether the transistor 408 is turned on or off. In another example, during the start-up process, the voltage signal 182 increases in magnitude in response to the voltage signal 172 through the resistor 124 and the capacitor 120. Once the voltage signal 182 reaches a predetermined magnitude, it was clamped (e.g., fixed) by at least the zener diode 402 in some embodiments. For example, during the start-up process, a voltage signal 424 at the terminal 112 (e.g., terminal VDD) is lower than a first predetermined threshold voltage (e.g., an upper threshold) in magnitude, and the UVLO component 410 generates a signal 422 (e.g., porB) to close (e.g., to turn on) the switches 414 and 464 and a signal 470 (e.g., por) to open (e.g., to turn off) the switches 466 and 468. In another example, when the signal 422 is at a logic high level, the signal 470 is at a logic low level, and when the signal 422 is at the logic low level, the signal 470 is at the logic high level.

In one embodiment, when the difference between the voltage signal 182 and the voltage signal 180 is larger than a threshold, the transistor 122 begins to conduct a current 1174 which flows through the terminal 118 (e.g., terminal SW). In another example, if the switch 414 is closed (e.g., on) in response to the signal 422 (e.g., porB), the current 1174 flows through the diode 412 and the switch 414 to charge the capacitor 128 and the voltage signal 424 at the terminal 112 (e.g., terminal VDD) increases in magnitude. In yet another example, when the voltage signal 424 exceeds the first predetermined threshold voltage in magnitude, the UVLO component 410 changes the signal 422 to open (e.g., to turn off) the switch 414. In yet another example, if the voltage signal 424 drops below a second predetermined threshold voltage (e.g., a lower threshold) in magnitude, the UVLO component 410 changes the signal 422 to close (e.g., to turn on) the switch 414 in order to charge the capacitor 128 again. In yet another example, if the voltage signal 424 exceeds the first predetermined threshold voltage in magnitude, the switch 466 is closed (e.g., on) in response to the signal 470 generated by the UVLO component 410, and the voltage signal 182 is clamped (e.g., fixed) by the zener diode 402. In yet another example, if the voltage signal 424 drops below the second predetermined threshold voltage in magnitude, the switch 466 is opened (e.g., off) in response to the signal 470 generated by the UVLO component 410, and the voltage signal 182 is clamped (e.g., fixed) by both the zener diode 402 and the zener diode 462. In yet another example, the first predetermined threshold voltage is different from or the same as the second predetermined threshold voltage.

In another embodiment, when the controller 102 operates normally, if the voltage signal 424 is larger than the first predetermined threshold voltage in magnitude, the switch 468 is closed (e.g., on) in response to the signal 470 generated by the UVLO component 410 and the switch 464 is opened (e.g., off) in response to the signal 422. In another example, the charged capacitor 120 provides a current 450 which flows through the resistor 430. In yet another example, a reference voltage signal 452 (e.g., $V_{ref}$) is generated in response to the current 450 flowing from the resistor 430 to the voltage clamper 432. In some embodiments, the reference voltage signal 452 is provided to a voltage regulator as a reference level. For example, the voltage regulator includes the transistor 434 which is configured as a source follower. In another example, the reference voltage signal 452 is generated at a terminal 454 (e.g., gate terminal) of the transistor 434. In yet another example, if the transistor 434 is turned on, a voltage signal 456 (e.g., AVDD) is generated at a terminal 458 of the transistor 434 through the resistor 436. In yet another example, the signal 456 (e.g., AVDD) is an internal signal of the controller 102, e.g., an internal supply voltage.

$$V_{AVDD} = V_{ref} - V_{th} \qquad (3)$$

where $V_{ref}$ represents the reference voltage signal 452, and $V_{th}$ represents a threshold voltage of the transistor 434.

According to another embodiment, a system controller for regulating a power conversion system includes a first controller terminal associated with a first controller voltage and coupled to a first transistor terminal of a first transistor, the first transistor further including a second transistor terminal and a third transistor terminal, the second transistor terminal being coupled to a primary winding of a power conversion system, a second controller terminal associated with a second controller voltage and coupled to the third transistor terminal, and a third controller terminal associated with a third controller voltage. The first controller voltage is equal to a sum of the third controller voltage and a first voltage difference. The second controller voltage is equal to a sum of the third controller voltage and a second voltage difference. The system controller is configured to, keep the first voltage difference constant and change the second voltage difference to turn on or off the first transistor and to affect a primary current flowing through the primary winding. For example, the system controller is implemented according to FIG. 1, FIG. 2, FIG. 3(a), FIG. 3(b), FIG. 4, and/or FIG. 5.

According to yet another embodiment, a system controller for regulating a power conversion system includes a first controller terminal associated with a first controller voltage and coupled to a first transistor terminal of a first transistor, the first transistor further including a second transistor terminal and a third transistor terminal, the second transistor terminal being coupled to a primary winding of a power conversion system, a second controller terminal associated with a second controller voltage and coupled to the third transistor terminal and a first capacitor terminal of a first capacitor, and a third controller terminal associated with a third controller voltage. The system controller further includes a second transistor including a fourth transistor terminal, a fifth transistor terminal and a sixth transistor terminal, the fifth transistor terminal being coupled to the second controller terminal, and a first clamping component including a first component terminal and a second component terminal, the first component terminal being coupled to the first controller terminal. For example, the system controller is implemented according to at least FIG. 2, FIG. 3(a), FIG. 3(b), FIG. 4, and/or FIG. 5.

According to yet another embodiment, a system controller for regulating a power conversion system includes a first controller terminal associated with a first controller voltage and coupled to a first transistor terminal of a first transistor, the first transistor further including a second transistor terminal and a third transistor terminal, the second transistor terminal being coupled to a primary winding of a power conversion system, a second controller terminal associated with a second controller voltage and coupled to the third transistor terminal, the second controller terminal being further coupled to a first capacitor terminal of a first capacitor through a diode, and a third controller terminal associated with a third controller voltage. The system controller further includes a second transistor including a fourth transistor terminal, a fifth transistor terminal and a sixth transistor terminal, the fifth transistor terminal being coupled to the second controller terminal, and the diode including an anode terminal and a cathode terminal, the cathode terminal being coupled to the first capacitor terminal, the anode terminal being coupled to the second controller terminal. The system controller is configured to charge the first capacitor through the diode in response to one or more current spikes. For example, the system controller is implemented according to at least FIG. 2, FIG. 3(a), FIG. 3(b), FIG. 4, and/or FIG. 5.

According to yet another embodiment, a system controller for regulating a power conversion system includes, a first controller terminal associated with a first controller voltage and coupled to a first transistor terminal of a first transistor, the first transistor further including a second transistor terminal and a third transistor terminal, the second transistor terminal being coupled to a primary winding of the power conversion system, a second controller terminal associated with a second controller voltage and coupled to the third transistor terminal, and a third controller terminal associated with a third controller voltage. The system controller further includes a fourth controller terminal associated with a fourth controller voltage and coupled to a first capacitor terminal of a capacitor, the capacitor further including a second capacitor terminal coupled to the third controller terminal, a second transistor including a fourth transistor terminal, a fifth transistor terminal and a sixth transistor terminal, the fifth transistor terminal being coupled to the second controller terminal, and a switch configured to received a control signal and including a first switch terminal and a second switch terminal, the first switch terminal coupled to the second controller terminal, the second switch terminal coupled to the fourth controller terminal. The system controller is configured to close the switch if the second transistor is turned on and if the fourth controller voltage is smaller than a first threshold. For example, the system controller is implemented according to at least FIG. 3(a), FIG. 3(b), FIG. 4, and/or FIG. 5.

In one embodiment, a system controller for regulating a power conversion system includes, a first controller terminal associated with a first controller voltage and coupled to a first transistor terminal of a first transistor, the first transistor further including a second transistor terminal and a third transistor terminal, the third transistor terminal being coupled to a primary winding of the power conversion system, a second transistor including a fourth transistor terminal, a fifth transistor terminal and a sixth transistor terminal, the sixth transistor terminal coupled to a first resistor, and a first clamping component coupled to the fourth transistor terminal. The first clamping component is configured to receive a current associated with the first controller voltage, generate a reference voltage based on at least information associated with the current, and bias the fourth transistor terminal to the reference voltage to generate a supple voltage at the fifth transistor terminal. For example, the system controller is implemented according to at least FIG. 4, and/or FIG. 5.

In another embodiment, a method for regulating a power conversion system including a system controller with a first controller terminal, a second controller terminal and a third controller terminal, includes, generating a first controller voltage associated with the first controller terminal coupled to a first transistor terminal of a first transistor, the first transistor further including a second transistor terminal and a third transistor terminal, the second transistor terminal being coupled to a primary winding of the power conversion system, generating a second controller voltage associated with the second controller terminal coupled to the third transistor terminal, and generating a third controller voltage associated with the third controller terminal. The method further includes processing information associated with the first controller voltage, the second controller voltage and the third controller voltage, the first controller voltage being equal to a sum of the third controller voltage and a first voltage difference, the second controller voltage is equal to a sum of the third controller voltage and a second voltage difference, keeping the first voltage difference constant, and changing the second voltage difference to turn on or off the first transistor to affect a primary current flowing through the primary winding. For example, the method is implemented according to FIG. 1, FIG. 2, FIG. 3(a), FIG. 3(b), FIG. 4, and/or FIG. 5.

In yet another embodiment, a method for regulating a power conversion system including a system controller with a controller terminal includes, generating a controller voltage associated with the controller terminal coupled to a first transistor terminal of a first transistor, the first transistor further including a second transistor terminal and a third transistor terminal, the third transistor terminal being coupled to a primary winding of the power conversion system, generating a current associated with the controller voltage, biasing a fourth transistor terminal of a second transistor to a reference voltage based on at least information associated with the current, the second transistor further including a fifth transistor terminal and a sixth transistor terminal, the sixth transistor terminal being coupled to a resistor, and generating a supply voltage at the fifth transistor terminal based on at least information associated with the reference voltage. For example, the method is implemented according to at least FIG. 4, and/or FIG. 5.

According to another embodiment, a system controller for regulating a power conversion system includes a controller terminal associated with a controller voltage and coupled to a first transistor terminal of a first transistor, the first transistor further including a second transistor terminal and a third transistor terminal, the third transistor terminal being coupled to a primary winding of the power conversion system, a first resistor coupled to the controller terminal, and a clamping component coupled to the first resistor. The clamping component is configured to receive a current from the first resistor associated with the controller voltage, generate a reference voltage based on at least information associated with the current, and output the reference voltage to a voltage regulator. For example, the system controller is implemented according to at least FIG. 4, and/or FIG. 5.

According to yet another embodiment, a method for regulating a power conversion system including a system controller with a controller terminal includes, generating a controller voltage associated with the controller terminal coupled to a first transistor terminal of a first transistor, the first transistor further including a second transistor terminal and a third transistor terminal, the third transistor terminal being coupled to a primary winding of the power conversion system, generating a current associated with the controller voltage, the current flowing through a resistor coupled to the controller terminal, generating a reference voltage based on at least information associated with the current, and outputting the reference voltage to a voltage regulator. For example, the method is implemented according to at least FIG. 4, and/or FIG. 5.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for regulating a power conversion system, the system controller comprising:
a first controller terminal associated with a first controller voltage and coupled to a first transistor terminal of a first transistor, the first transistor further including a second transistor terminal and a third transistor terminal, the second transistor terminal being coupled to a primary winding of the power conversion system;
a second controller terminal associated with a second controller voltage and coupled to the third transistor terminal;
a third controller terminal associated with a third controller voltage;
a second transistor including a fourth transistor terminal, a fifth transistor terminal and a sixth transistor terminal, the fifth transistor terminal being coupled to the second controller terminal; and
a first clamper including a first clamper terminal and a second clamper terminal, the first clamper terminal being coupled to the first controller terminal;
wherein:
the second controller voltage is equal to a sum of the third controller voltage and a first voltage difference; and
the second transistor is configured to change the first voltage difference to turn on or off the first transistor and to affect a current flowing through the primary winding.

2. The system controller of claim 1 wherein:
the first controller voltage is equal to a sum of the third controller voltage and a second voltage difference; and
the first clamper is configured to keep the second voltage difference from exceeding a predetermined threshold.

3. The system controller of claim 1, and further comprising:
a second clamper including a third clamper terminal and a fourth clamper terminal;
a switch configured to receive a signal and including a first switch terminal and a second switch terminal, the first switch terminal coupled to the second clamper terminal and the third clamper terminal, the second switch terminal coupled to the fourth clamper terminal; and
a fourth controller terminal associated with a fourth controller voltage and coupled to a first capacitor terminal of a capacitor, the capacitor further including a second capacitor terminal coupled to the third controller terminal;
wherein the switch is configured to:
in response to the fourth controller voltage becoming larger than a first threshold, become closed to short the second clamper; and
in response to the fourth controller voltage becoming lower than a second threshold, become open.

4. The system controller of claim 3 wherein the second controller terminal is coupled to the fourth controller terminal through a diode, the diode including an anode terminal and a cathode terminal, the cathode terminal being coupled to the fourth controller terminal, the anode terminal being coupled to the second controller terminal.

5. A system controller for regulating a power conversion system, the system controller comprising:
a first controller terminal associated with a first controller voltage and coupled to a first transistor terminal of a first transistor, the first transistor further including a second transistor terminal and a third transistor terminal, the second transistor terminal being coupled to a primary winding of the power conversion system;
a second controller terminal associated with a second controller voltage and coupled to the third transistor terminal;
a third controller terminal associated with a third controller voltage;
a fourth controller terminal associated with a fourth controller voltage and coupled to a first capacitor terminal of a first capacitor, the first capacitor further including a second capacitor terminal coupled to the third controller terminal;

a second transistor including a fourth transistor terminal, a fifth transistor terminal and a sixth transistor terminal, the fifth transistor terminal being coupled to the second controller terminal; and a switch configured to receive a signal and including a first switch terminal and a second switch terminal, the second switch terminal coupled to the fourth controller terminal;

wherein the switch is configured to, in response to the fourth controller voltage becoming smaller than a first threshold, become closed.

6. The system controller of claim 5 wherein the switch is further configured to, in response to the fourth controller voltage becoming larger than a second threshold, become open.

7. The system controller of claim 5, and further comprising:

a current source including a first source terminal and a second source terminal, the first source terminal being coupled to the fourth controller terminal; and a diode including an anode terminal and a cathode terminal, the anode terminal being coupled to the second source terminal, the cathode terminal being coupled to the first controller terminal;

wherein:
the first controller terminal is further coupled to a third capacitor terminal of a second capacitor, the second capacitor further including a fourth capacitor terminal coupled to the third controller terminal; and the second capacitor is configured to be charged by a current associated with the current source through the diode in response to the first controller voltage being smaller than a second threshold.

8. The system controller of claim 5, and further comprising:

a clamper coupled to the first controller terminal;
wherein:
the second controller voltage is equal to a sum of the third controller voltage and a first voltage difference; and the second transistor is configured to change the first voltage difference to turn on or off the first transistor and to affect a current flowing through the primary winding.

9. The system controller of claim 8 wherein:
the first controller voltage is equal to a sum of the third controller voltage and a second voltage difference; and
the clamper is configured to keep the second voltage difference from exceeding a predetermined threshold.

10. A system controller for regulating a power conversion system, the system controller comprising:

a first controller terminal associated with a first controller voltage and coupled to a first transistor terminal of a first transistor, the first transistor further including a second transistor terminal and a third transistor terminal, the second transistor terminal being coupled to a primary winding of the power conversion system;

a second controller terminal associated with a second controller voltage and coupled to the third transistor terminal;

a third controller terminal associated with a third controller voltage and coupled to a first capacitor terminal of a first capacitor, the first capacitor further including a second capacitor terminal; and a first diode including a first anode terminal and a first cathode terminal, the first cathode terminal being coupled to the first controller terminal;

wherein:
the first controller terminal is further coupled to a third capacitor terminal of a second capacitor, the second capacitor further including a fourth capacitor terminal; and the second capacitor is configured to be charged by a current flowing from the first diode in response to the first controller voltage being smaller than a first threshold.

11. The system controller of claim 10, and further comprising:

a switch configured to receive a signal and including a first switch terminal and a second switch terminal, the second switch terminal coupled to the third controller terminal;

wherein the switch is configured to, in response to the third controller voltage becoming smaller than a second threshold, become closed.

12. The system controller of claim 11, and further comprising a second diode including a second anode terminal and a second cathode terminal, the second anode terminal being coupled to the second controller terminal, the second cathode terminal being coupled to the first switch terminal.

13. The system controller of claim 12 wherein the second anode terminal is coupled to the second controller terminal through a resistor.

14. A system controller for regulating a power conversion system, the system controller comprising:

a first controller terminal associated with a first controller voltage and coupled to a first transistor terminal of a first transistor, the first transistor further including a second transistor terminal and a third transistor terminal, the second transistor terminal being coupled to a primary winding of the power conversion system;

a second transistor including a fourth transistor terminal, a fifth transistor terminal and a sixth transistor terminal, the sixth transistor terminal coupled to a first resistor; and a first clamper coupled to the fourth transistor terminal;
wherein the first clamper is configured to receive a first current associated with the first controller voltage, generate a reference voltage based at least in part on the first current, and bias the fourth transistor terminal to the reference voltage to generate a supply voltage at the sixth transistor terminal.

15. The system controller of claim 14 wherein the fourth transistor terminal is coupled to the first controller terminal through a second resistor.

16. The system controller of claim 14, and further comprising:

a second controller terminal associated with a second controller voltage and coupled to the third transistor terminal; and a third controller terminal associated with a third controller voltage.

17. The system controller of claim 16, and further comprising:

a second clamper coupled to the first controller terminal; and a third transistor configured to change a first voltage difference to turn on or off the first transistor and to affect a second current flowing through the primary winding;

wherein the second controller voltage is equal to a sum of the third controller voltage and the first voltage difference.

18. The system controller of claim 17 wherein:
the first controller voltage is equal to a sum of the third controller voltage and a second voltage difference; and
the second clamper is configured to keep the second voltage difference from exceeding a predetermined threshold.

19. The system controller of claim 14, and further comprising:
a second controller terminal associated with a second controller voltage;
a third controller terminal associated with a third controller voltage and coupled to a first capacitor terminal of a capacitor, the capacitor further including a second capacitor terminal coupled to the second controller terminal; and
a first switch configured to receive a first signal and including a first switch terminal and a second switch terminal, the first switch terminal coupled to the fourth transistor terminal.

20. The system controller of claim 19, and further comprising:
a second switch configured to receive a second signal and configured to:
in response to the third controller voltage becoming larger than a first threshold, become closed to conduct the first current flowing to the first clamper; and
in response to the third controller voltage becoming smaller than a second threshold, become open.

21. The system controller of claim 20 wherein the first switch is further configured to:
in response to the third controller voltage becoming larger than the first threshold, become open; and
in response to the third controller voltage becoming smaller than the second threshold, become closed.

22. The system controller of claim 14, and further comprising:
a second controller terminal associated with a second controller voltage;
a third controller terminal associated with a third controller voltage and coupled to a first capacitor terminal of a capacitor, the capacitor further including a second capacitor terminal coupled to the second controller terminal; and
a switch configured to receive a signal and configured to:
in response to the third controller voltage becoming larger than a first threshold, become closed to conduct the first current flowing to the first clamper;
in response to the third controller voltage becoming smaller than a second threshold, become open.

23. The system controller of claim 22 wherein the first threshold and the second threshold are equal.

24. The system controller of claim 22 wherein the first threshold and the second threshold are not equal.

25. The system controller of claim 24 wherein the first threshold is larger than the second threshold.

26. A system controller for regulating a power conversion system, the system controller comprising:
a first controller terminal associated with a first controller voltage and coupled to a first transistor terminal of a first transistor, the first transistor further including a second transistor terminal and a third transistor terminal, the second transistor terminal being coupled to a primary winding of the power conversion system;
a second controller terminal associated with a second controller voltage and coupled to a first capacitor terminal of a capacitor, the capacitor further including a second capacitor terminal;
a second transistor including a fourth transistor terminal, a fifth transistor terminal and a sixth transistor terminal, the sixth transistor terminal coupled to a resistor;
a clamper coupled to the fourth transistor terminal; and
a switch configured to receive a signal and configured to:
in response to the second controller voltage becoming larger than a first threshold, become closed to conduct a current flowing to the clamper, the current being associated with the first controller voltage; and
in response to the second controller voltage becoming smaller than a second threshold, become open;
wherein the clamper is configured to, in response to receiving the current from the switch:
generate a reference voltage based at least in part on the current; and
bias the fourth transistor terminal to the reference voltage to generate a supply voltage at the sixth transistor terminal.

27. The system controller of claim 26 wherein the first threshold and the second threshold are equal.

28. The system controller of claim 26 wherein the first threshold and the second threshold are not equal.

29. The system controller of claim 28 wherein the first threshold is larger than the second threshold.

30. A method for regulating a power conversion system, the method comprising:
generating a first controller voltage associated with a first controller terminal, the first controller terminal being coupled to a first transistor terminal of a first transistor and further coupled to a first capacitor terminal of a first capacitor, the first transistor further including a second transistor terminal and a third transistor terminal, the second transistor terminal being coupled to a primary winding of the power conversion system, the first capacitor further including a second capacitor terminal;
generating a second controller voltage associated with a second controller terminal coupled to the third transistor terminal;
biasing a third controller terminal to a third controller voltage, the third controller terminal being coupled to a third capacitor terminal of a second capacitor, the second capacitor further including a fourth capacitor terminal; and
charging the first capacitor by a current flowing from a first diode in response to the first controller voltage being smaller than a first threshold, the first diode including a first anode terminal and a first cathode terminal, the first cathode terminal being coupled to the first controller terminal.

31. A method for regulating a power conversion system including a system controller with one or more controller terminals, the method comprising:
generating a controller voltage associated with the one or more controller terminals coupled to a first transistor terminal of a first transistor, the first transistor further including a second transistor terminal and a third transistor terminal, the second transistor terminal being coupled to a primary winding of the power conversion system;
generating a current associated with the controller voltage;
biasing a fourth transistor terminal of a second transistor to a reference voltage based at least in part on the current, the second transistor further including a fifth transistor terminal and a sixth transistor terminal, the sixth transistor terminal being coupled to a resistor; and generating a supply voltage at the sixth transistor terminal based at least in part on the reference voltage.

32. A method for regulating a power conversion system including a system controller with one or more controller terminals, the method comprising:
- generating a first controller voltage associated with a first controller terminal coupled to a first transistor terminal of a first transistor, the first transistor further including a second transistor terminal and a third transistor terminal, the second transistor terminal being coupled to a primary winding of the power conversion system;
- biasing a second controller terminal to a second controller voltage, the second controller terminal being coupled to a first capacitor terminal of a capacitor, the capacitor further including a second capacitor terminal;
- in response to the second controller voltage becoming larger than a first threshold, closing a switch to conduct a current flowing to a clamper, the current being associated with the first controller voltage, the clamper being coupled to a fourth transistor terminal of a second transistor, the second transistor further including a fifth transistor terminal and a sixth transistor terminal;
- in response to the second controller voltage becoming smaller than a second threshold, opening the switch; and
- in response to receiving the current from the switch,
  - generating a reference voltage based at least in part on the current; and
  - biasing the fourth transistor terminal to the reference voltage to generate a supply voltage at the sixth transistor terminal.

\* \* \* \* \*